(12) United States Patent
Fletcher

(10) Patent No.: US 11,684,053 B2
(45) Date of Patent: Jun. 27, 2023

(54) SPRING ACTUATED WEEDLESS FISHING LURE

(71) Applicant: Domkos Investments, Inc., Dallas, TX (US)

(72) Inventor: Jake Fletcher, Dallas, TX (US)

(73) Assignee: Domkos Investments, Inc., Dallas, TX (US)

( * ) Notice: Subject to any disclaimer, the term of this patent is extended or adjusted under 35 U.S.C. 154(b) by 335 days.

(21) Appl. No.: 16/008,139

(22) Filed: Jun. 14, 2018

(65) Prior Publication Data

US 2018/0360011 A1    Dec. 20, 2018

Related U.S. Application Data

(60) Provisional application No. 62/520,299, filed on Jun. 15, 2017.

(51) Int. Cl.
*A01K 83/02* (2006.01)
*A01K 85/02* (2006.01)

(52) U.S. Cl.
CPC .............. *A01K 85/02* (2013.01); *A01K 83/02* (2013.01)

(58) Field of Classification Search
CPC ......... A01K 85/00; A01K 85/02; A01K 83/02
USPC ....... 43/34, 35, 37, 42.04, 42.41, 43.4, 43.6, 43/44.2, 44.8
See application file for complete search history.

(56) References Cited

U.S. PATENT DOCUMENTS

| 395,480 | A | * | 1/1889 | Brewster | A01K 85/12 43/35 |
| 945,091 | A | * | 1/1910 | Hanel | A01K 85/02 43/35 |
| 1,869,111 | A | | 8/1930 | McLaughlin | |
| 2,325,247 | A | * | 7/1943 | Helfenstein | A01K 83/02 43/36 |
| 2,485,946 | A | | 11/1945 | Watt | |
| 2,521,555 | A | * | 9/1950 | Widmer | A01K 85/02 43/42.36 |
| 2,722,764 | A | | 10/1953 | Juhrend | |
| 3,019,544 | A | | 7/1959 | Hummel | |
| 3,359,625 | A | * | 12/1967 | Rossnan | A01K 83/00 29/436 |
| 3,465,466 | A | * | 9/1969 | Showalter | A01K 83/06 43/44.8 |
| 3,574,265 | A | | 4/1971 | Gibbons et al. | |
| 3,670,446 | A | | 6/1972 | Wheeler | |
| 4,166,334 | A | * | 9/1979 | Talalaj | A01K 85/02 43/42.43 |

(Continued)

*Primary Examiner* — David J Parsley
(74) *Attorney, Agent, or Firm* — Scheef & Stone, LLP; Robin L. Barnes

(57) ABSTRACT

A spring actuated weedless fishing lure increases the chances of successfully catching a fish without entangling a hook on plant material. A weedless guard system prevents the hook from catching on weeds and compresses a spring to hold the spring and hook in a retracted position. When a fish strikes, the weedless guard system is released allowing the spring to expand and push the hook in a longitudinal direction to an expanded position away from other parts of the lure. This expanded position provides a greater area for the fish's mouth to engage with the hook without interference from other parts of the lure. The expanded position also allows the hooks to embed closer to the front of a fish's mouth and reduces the risk of the fish swallowing the whole lure.

4 Claims, 4 Drawing Sheets

(56) References Cited

U.S. PATENT DOCUMENTS

| | | | |
|---|---|---|---|
| 4,176,489 A * | 12/1979 | Levstik | A01K 85/16 43/35 |
| 4,274,220 A * | 6/1981 | Rogers, Jr. | A01K 85/16 43/35 |
| 4,782,618 A * | 11/1988 | Rainey | A01K 85/02 43/35 |
| 5,007,195 A | 4/1991 | Patterson | |
| 5,628,138 A | 5/1997 | Murray, Jr. | |
| 5,878,524 A * | 3/1999 | Braden | A01K 85/02 43/35 |
| 5,890,314 A | 4/1999 | Peters | |
| 6,105,303 A | 8/2000 | Hall, Sr. | |
| 6,772,552 B2 | 8/2004 | Parrish | |
| 2007/0101634 A1* | 5/2007 | Clapp | A01K 83/02 43/35 |
| 2010/0058644 A1* | 3/2010 | Wulf | A01K 85/02 43/35 |
| 2012/0180372 A1 | 7/2012 | Kennedy | |
| 2014/0013648 A1 | 1/2014 | Yong-Set | |

\* cited by examiner

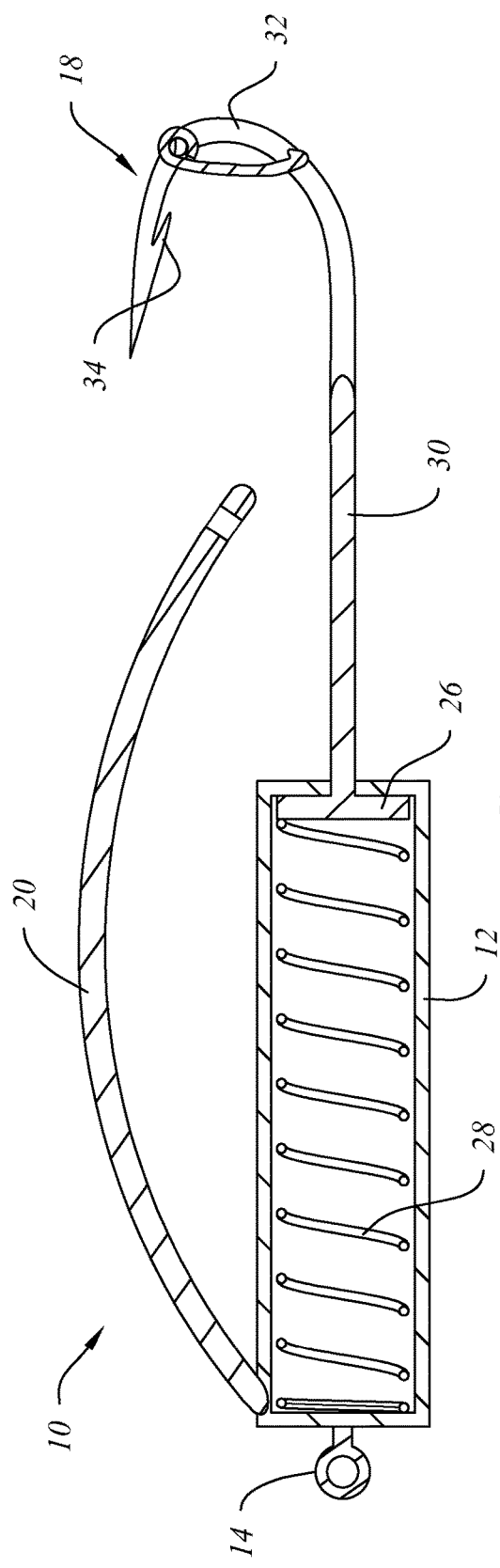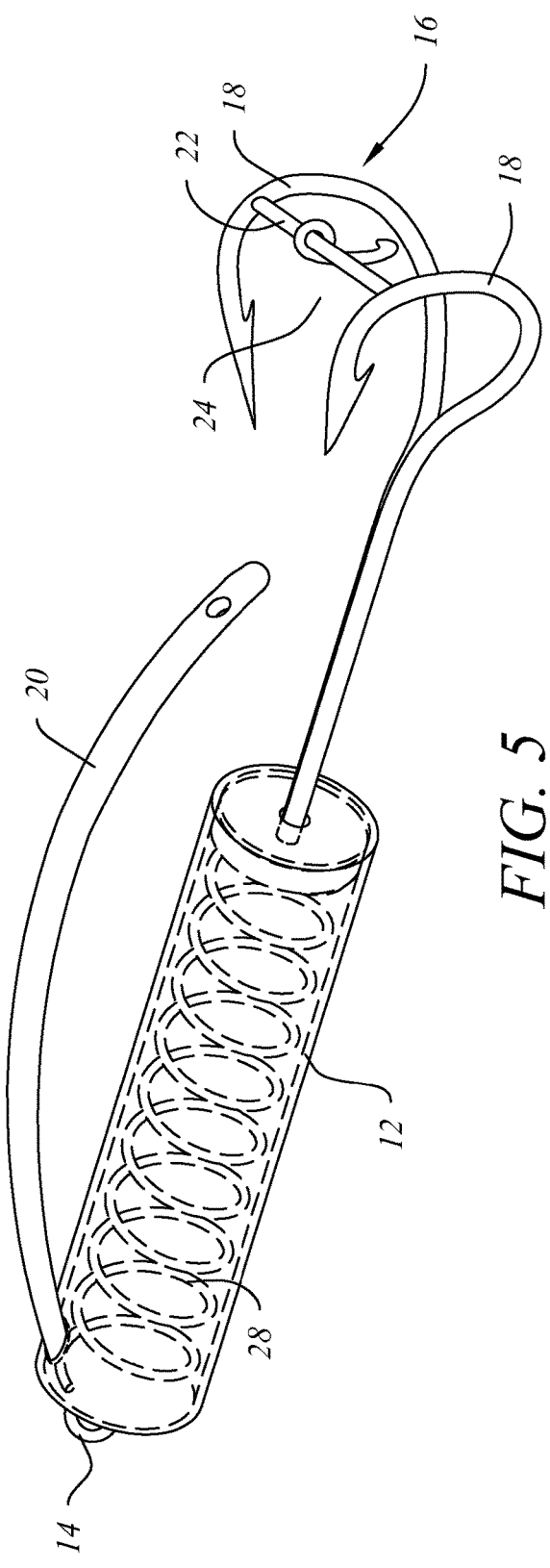

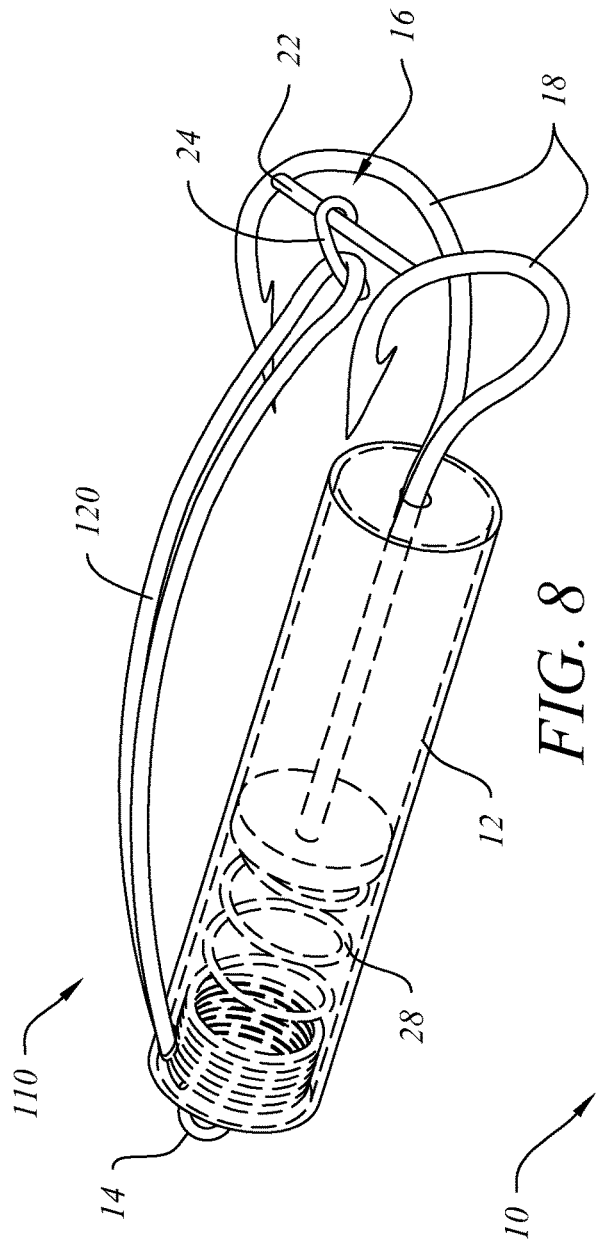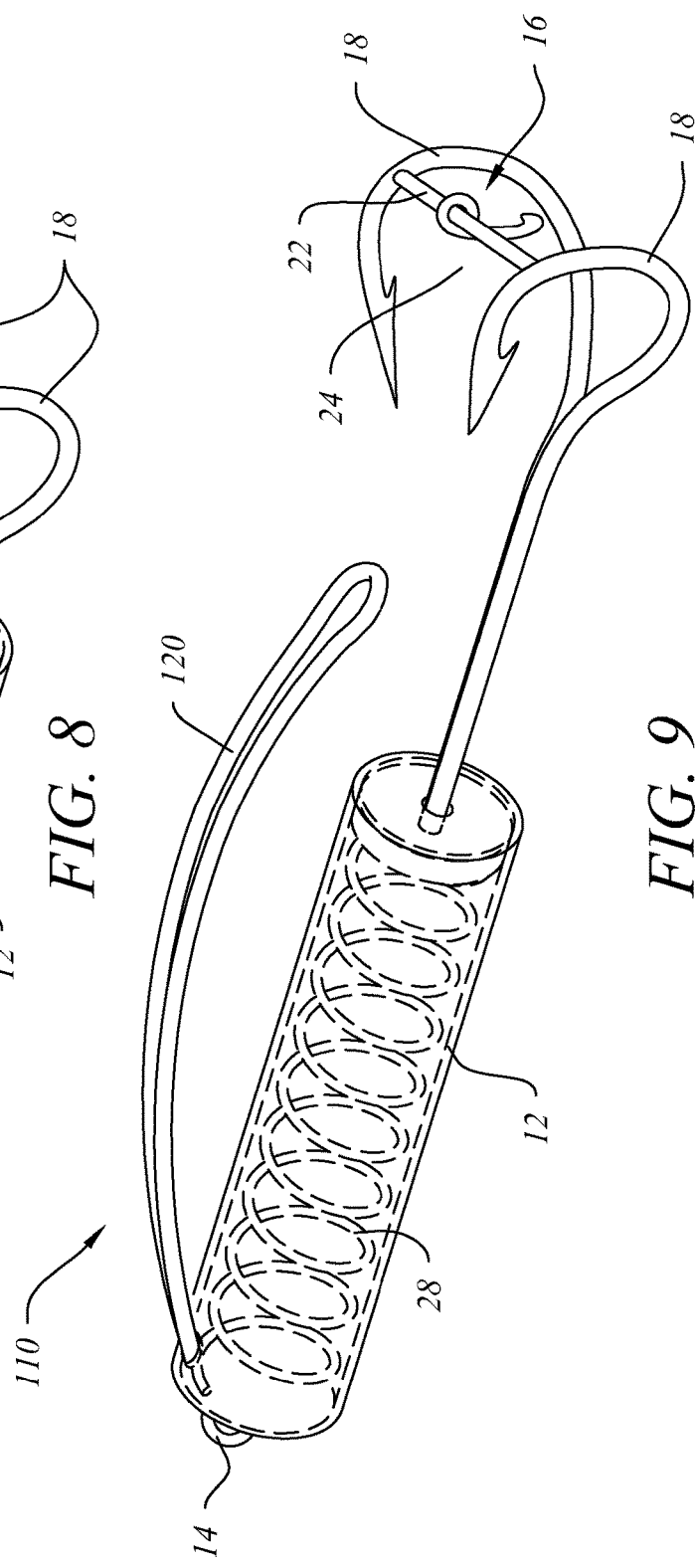

SPRING ACTUATED WEEDLESS FISHING LURE

CROSS-REFERENCE TO RELATED APPLICATION

This application claims the benefit of U.S. Provisional Application Ser. No. 62/520,299 filed on Jun. 15, 2017.

BACKGROUND OF THE INVENTION

1. Field of the Invention

This invention relates to a spring actuated weedless fishing lure that projects one or more hooks in a longitudinal direction to more securely attach to a fish upon engaging the lure.

2. Description of Related Art

Weedless fishing lures provide a mechanism to prevent the hook from snagging on plant material, such as a tree limb or lily pad, while fishing. These types of lures are well known in the prior art. For example, U.S. Pat. No. 3,670,446 discloses a single or double hook lure with a guard that holds the end of the hook(s) so they do not hook into any plant material. Once engaged by a fish, the hook end is released from the guard allowing the hook to embed in the fish's mouth. In another example, U.S. Pat. No. 5,628,138, the hook end is hidden within a cavity of the lure body (shaped like a small fish for example). The hook is attached to a "spring member" that has an upper, stiff curved portion and a lower flexible portion of spring steel or resilient plastic. When engaged by a fish, the lower flexible portion is pushed toward the stiff portion, which causes the hook to move in an arcuate direction out of the cavity to embed in the fish's mouth.

These weedless prior art lures are effective at preventing the hook from getting caught on plant material; however, the guards that prevent the hook from snagging on plants and tree limbs can also result in missing a fish altogether. Once a fish strikes the lure, the guard mechanisms or other aspects of the lure body can interfere with the hook or provide only a small area for the fish's mouth to engage with the hook making it difficult for the hook to sufficiently embed in the mouth to catch the fish. Another problem with prior art lures, particularly in bass fishing, is that the fish can end up swallowing the whole lure. If there is a need to release the fish, it can be impossible to remove a swallowed lure without significantly harming the fish. There is a need for a weedless hooking system that does not interfere with embedding the hook in the fish's mouth, reduces the rate of catch failure after a strike, and reduces the risk of the fish swallowing the lure.

SUMMARY OF THE INVENTION

According to one preferred embodiment, a spring actuated weedless lure according to the invention comprises a housing, a spring disposed within the housing and configured to move a hook in a substantially longitudinal direction (relative to the housing), and a guard connected to the housing and releasably connected to the hook. When connected to the hook, the guard holds the hook and spring in a retracted position. Once a fish strikes, the connection between the guard and hook is released, allowing the spring to expand and to launch or move the hook from a retracted position to an extended position along a longitudinal axis relative to the housing. The hook is preferably extended out 1-3 inches from the proximal end of the housing when in an extended position. This allows the lure to have the benefits of a weedless hook but also prevents the guard or housing from interfering with catching the fish. The extended hook position also increases the chances of catching a fish since they are positioned in a larger exposed area with more distance between the hook and the rest of the lure, providing a greater chance of being embedded in the fish's mouth. It also allows the hook to embed in the first inch or two of the fish's mouth, without allowing the entire lure to be swallowed, making it easier to release the fish if desired.

According to another preferred embodiment, a spring actuated weedless lure like that described above is contained within a hollow body, preferably shaped like a frog, worm, small fish, or other design that would attract a fish to strike the lure. The housing, guard and hook are preferably disposed entirely within the hollow body when the spring is in a retracted position. The hollow body preferably has one or more apertures to allow the hook or hooks to extend out away from the body when the spring is released and the hooks or hooks are in an extended position. Most preferably, the hook or hooks are extended 1-3 inches beyond the proximal end of the hollow body when in an extended position. When a hollow body is used, the guard need not engage with the barb end of the hook to provide a weedless design because the hooks are disposed inside and protected from entanglement with plant material by the hollow body. A guard that does engage the barb ends of the hook, similar to that disclosed in U.S. Pat. No. 3,670,446 or in other prior art, may also be used with various embodiments of the invention with or without a hollow body.

BRIEF DESCRIPTION OF THE DRAWINGS

The system and method of the invention is further described and explained in relation to the following drawings wherein:

FIG. 4 is side elevation cross sectional view of the fishing lure of FIG. 1 in an extended position; FIG. 5 is a perspective cross sectional view of the fishing lure of FIG. 4;

FIG. 8 is a perspective cross sectional view of another preferred embodiment of a fishing lure in a retracted position; and FIG. 9 is a perspective cross sectional view of the embodiment of FIG. 8 in an extended position.

DESCRIPTION OF THE PREFERRED EMBODIMENTS

Figure 1:
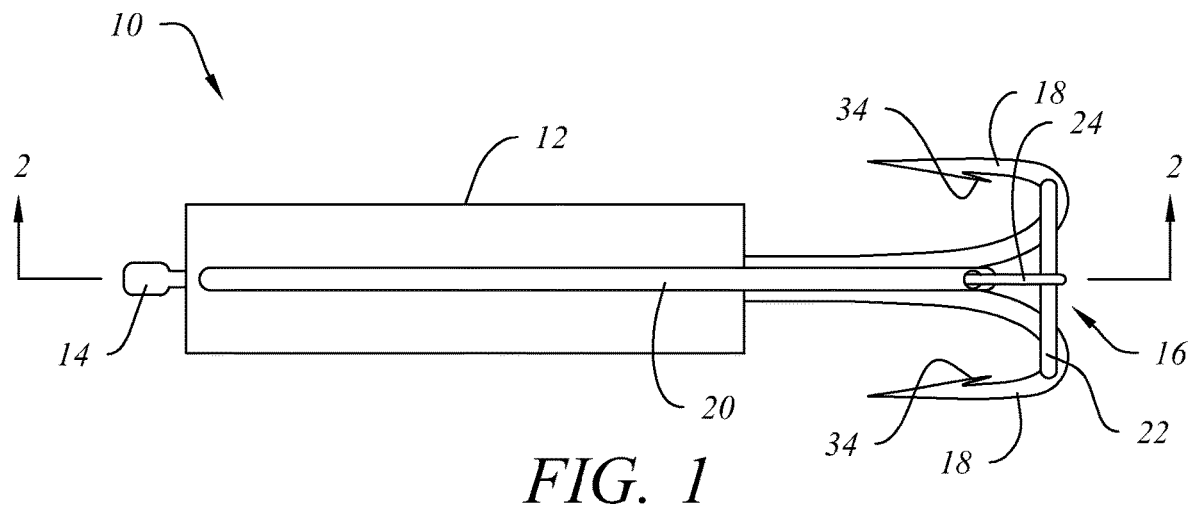
FIG. 1 is a top plan view of a double hook fishing lure in a retracted position according to one preferred embodiment.

Referring to FIGS. 1-5, one preferred embodiment of a spring actuated weedless lure 10 is depicted. Lure 10 preferably comprises a housing 12, an attachment mechanism 14, a weedless guard system 16, and a spring 28 disposed inside housing 12. Attachment mechanism 14 is preferably a ring or eye bolt secured to one end of housing 12 to allow lure 10 to be attached to a fishing line or connected to a hollow body (such as a decorative frog). Weedless guard system 16 preferably comprises a hook 18 and a guard 20. Guard 20 is preferably an elongated, flexible pin or wire loop. One end of guard 20 is connected to housing 12 and the other end of guard 20 is releasably connected to hook 18. Any prior art mechanism for releasably connecting a guard to a hook may be used with guard 20 and hook 18 in weedless guard system 16. When engaged, weedless guard system 16 holds hook 18 in a retracted position, compressing spring 28. When disengaged, weedless guard system 16 releases hook 18 allowing spring 28 to expand and move hook 18 in a substantially linear or longitudinal direction (aligned with or parallel to a longitudinal axis of housing 12) from its retracted position to an expanded position. Weedless guard system 16 is disengaged when external pressure is exerted on guard 20 in a direction substantially perpendicular to the direction of movement of hook 18 when released. When a fish strikes, its mouth exerts pressure in a substantially lateral direction (relative to housing), disengaging weedless guard system 16 and allowing hook 18 to move in a longitudinal direction.

Hook 18 may be a single hook, but is more preferably a double hook. Each hook 18 preferably comprises a longitudinal body or shaft 30, an curved or arcuate portion 32, and a barbed end 34. When a double hook 18 is used, a single shaft 30 may split or fork prior to arcuate portions 32 to form a double hook or two separate shafts 30 may be used. When a double hook 18 is used, wireless guard system 16 also preferably comprises brace 22 and a barb 24. Brace 22 is disposed between the two hooks 18 and barb 24 extends from brace 22. In this preferred embodiment, guard 20 is a single pin or piece of wire with one end connected to housing 12 and the distal end may have an aperture to engage with barb 24. Alternatively, the distal end of guard 20 may have a small hook or barb to engage with brace 22 (in which case it is not necessary to use barb 24) or a loop may dangle from brace 22 (in place of barb 24) to engage with the hook or barb on the end of guard 20. In another preferred embodiment as shown in FIGS. 8-9, guard 20 is in a loop configuration with both ends connected to housing 12 and the distal end of the loop engaging with barb 24 to secure hooks 18 in a retracted position. Barb 24 and guard 20 are made of materials that are preferably strong enough to remain engaged during use and flexible enough to allow them to disengage when the force from a fish biting the lure is applied. As additional alternatives, guard 20 may comprise a loop, or a single pin or piece of wire with a distal end having an aperture that is configured to engage with a barbed end of one or both hooks 18 (in which case, brace 22 and barb 24 are not necessary) or may comprise a single pin or piece of wire with a barb at its distal end configured to engage with brace 22 (in which case barb 24 is not needed).

Housing 12 is preferably substantially cylindrical with one sealed end near attachment mechanism 14. The other end is at least partially open to allow movement of an elongated shaft 30 or longitudinal portion of hook 18 along a longitudinal axis of housing 12. Spring 28 is preferably disposed inside housing 12, between the sealed end of housing 12 and plate 26, which is also disposed inside housing 12. Plate 26 is connected or connectable to the elongated shaft portion 30 of hook 18. Hook 18 and plate 26 may be integrally formed or connected together by adhesive, welding, threaded attachment, or the like. A seal, such as an o-ring, may optionally be placed around plate 26 to provide a water-tight or substantially water-tight seal to prevent water from entering the portion of housing 12 in which spring 28 is disposed. Alternatively, plate 26 may optionally be made of material, such as rubber, that acts as a seal against interior wall surfaces of housing 12 to prevent water from entering the portion of housing 12 in which spring 28 is disposed. This may allow the interior spring cavity of housing 12 to be filled with air or another gas to aid in lure 10 floating at or near the surface of the water, if desired.

Figure 2:
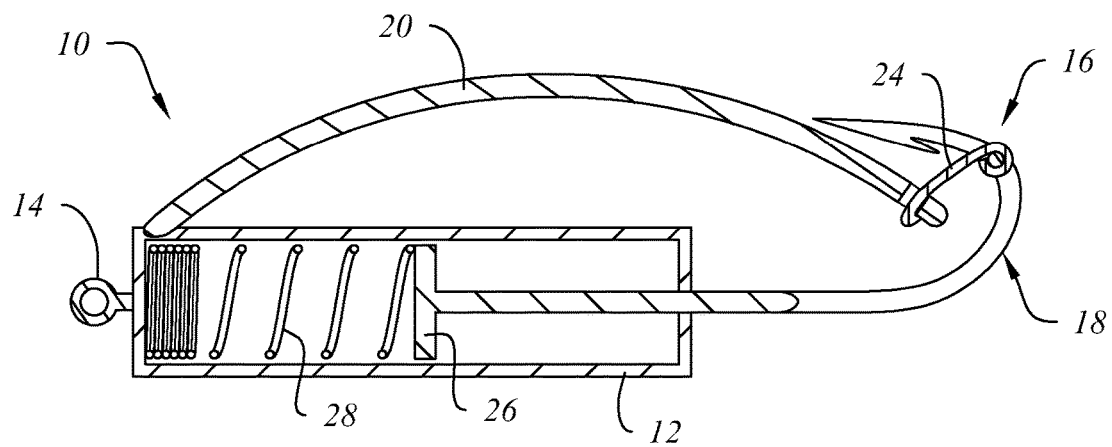
FIG. 2 is a side elevation cross sectional view of the fishing lure of FIG. 1.
Figure 3:
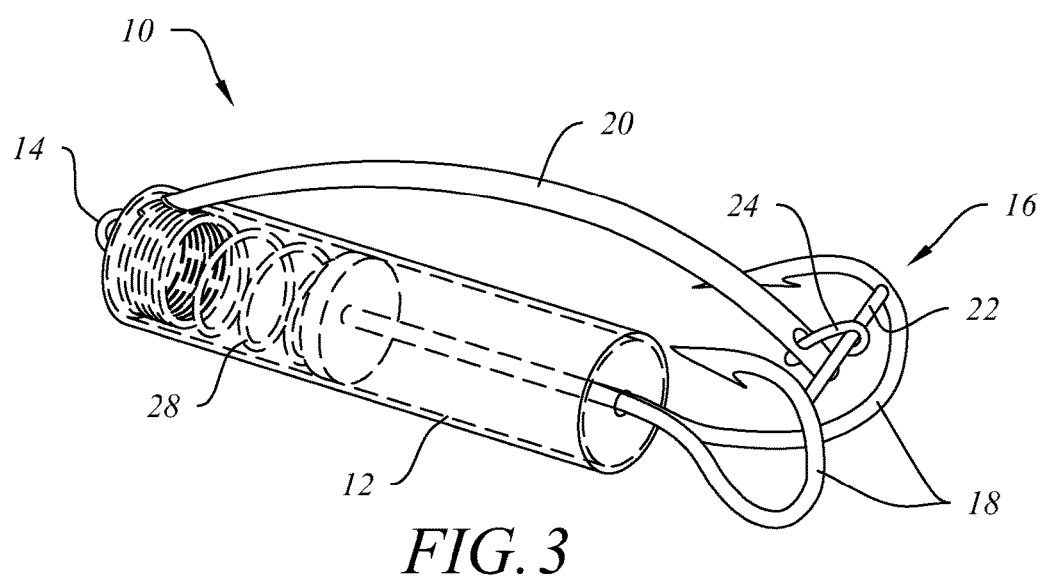
FIG. 3 is a perspective cross sectional view of the fishing lure of FIGS. 1 and 2.

When guard 20 is connected to hook 18 (or barb 24), it holds hook 18 and plate 26 in a retracted position, compressing spring 28 inside housing 12 as shown in FIGS. 1-3. When a fish strikes, its mouth puts pressure on guard 20, releasing it from hook 18 (or barb 24). When guard 20 is disengaged from hook 18 (or barb 24), plate 26 is no longer held in a retracted position allowing spring 28 to expand and push plate 26 rearwardly inside housing 12. This movement of plate 26 also causes hook 18 to move rearwardly, extending it along a longitudinal axis relative to housing 12 to an extended position as shown in FIGS. 4-5. The direction of hook movement is substantially longitudinal and not arcuate as in some prior art lures. Most preferably, the extended position for hook 18 is around 1-3 inches from the retracted position of hook 18 or around 1-3 inches the proximal end of a decorative hollow body (if used). The partially open end of housing 12 may comprise an annular lip that prevents plate 26 from being pulled out of housing 12 when the hook 18 embeds in the fish's mouth. Alternatively, plate 26 may be connected to spring 28 and spring 28 may be connected to housing 12, to maintain a connection between the hook 18 and housing 12 (and to the attached fishing line) when the hook 18 is embedded in the fish's mouth.

Figure 6:
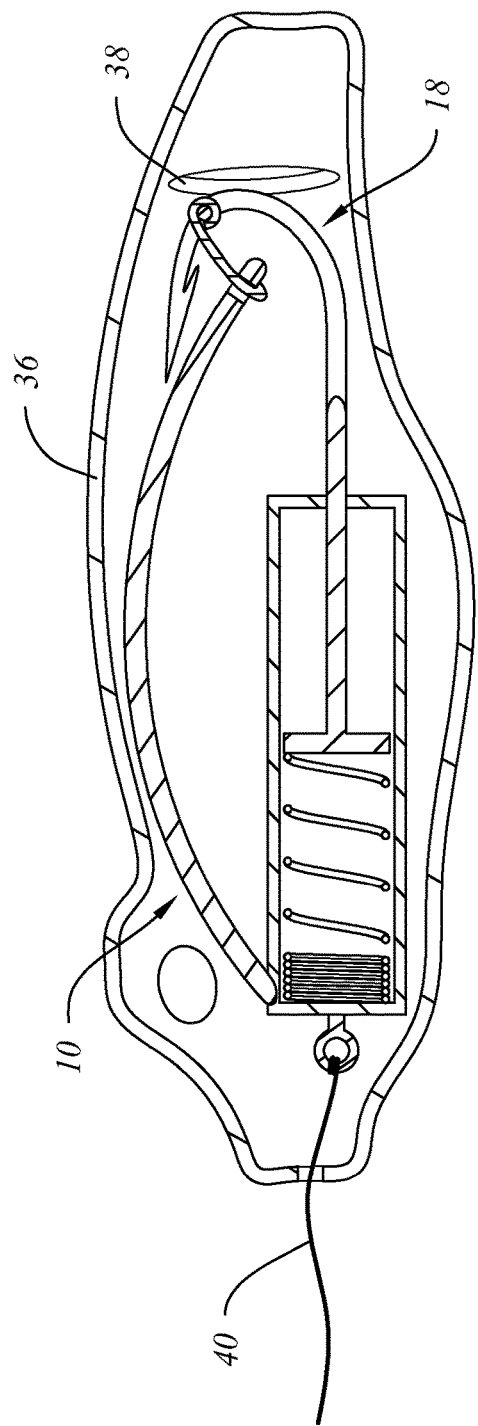
FIG. 6 is a side elevation cross sectional view of the fishing lure of FIG. 1 within one embodiment of a decorative hollow body.
Figure 7:
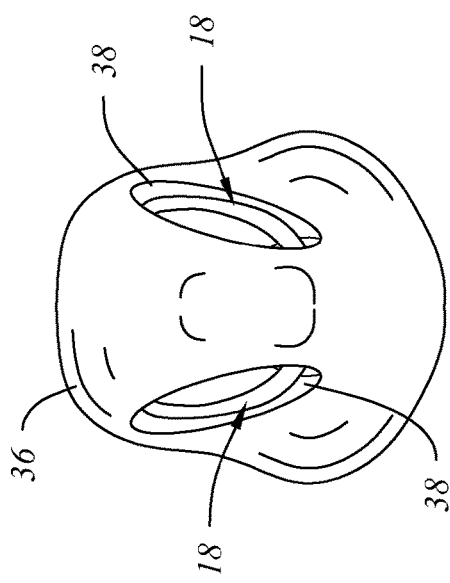
FIG. 7 is an end elevation of the embodiment shown in FIG. 6.

According to another preferred embodiment, lure 10 also comprises a decorative hollow body 36 that is in a shape, such as a frog as shown in FIG. 6, that would attract a fish to strike the lure. Other shapes for hollow body 36 may also be used. The hollow body 36 may also be part of the weedless guard system 16, by protecting all or part of hook 18 from substantial contact with plant material when hook 18 is in a retracted position. Preferably, at least the barb end 34 of hook 18, and more preferably all of hook 18 that is outside of housing 12 when in a retracted position, is disposed inside the hollow body 36. Most preferably housing 12, guard 20, hook 18, and brace 22 and barb 24 (if used) fit entirely within the hollow body 36 when the hook 18 is in a retracted position. The hollow body preferably has one or more apertures 38 that correspond in size and location with hook(s) 18 that will allow hook(s) 18 to extend through the apertures in the hollow body 36 when guard 20 is disengaged by a fish strike and spring 28 pushes the hooks 18 rearwardly (in a direction substantially opposite from where the fishing line is attached to lure 10). Alternatively, the barb end 34 of hook 18 may press up against an exterior surface of the hollow body when in a retracted position and other portions of lure 10 may be disposed inside the hollow body. A fishing line 40 may be attached to the hollow body (if used) or may pass through another aperture in the hollow body (such as a mouth of a frog body) to attach to attachment mechanism 14.

According to another preferred embodiment, spring 28 may be integrally formed with a longitudinal portion of hook 18 without requiring use of plate 26. According to another preferred embodiment, housing 12 may be integrally formed with attachment mechanism 14 and/or guard 20 or these parts may be connected together by adhesive, sonic welding, threaded connections, or a combination thereof. Housing 12 may also be integrally formed with hollow body 36 or housing and hollow body may be a single substantially cylindrical unit (particularly if a narrow bodied design, such as a worm, is used). Various materials, such as plastics, rubber, and metals, may be used for the parts of lure 10, as will be understood by those of ordinary skill in the art. Lure 10 according to various preferred embodiments may be of differing sizes, depending on the type of fish that the user desires to catch. Typically lure 10 (without hollow body 36) will preferably be around 2.5 to 5.5 inches long (in a retracted position) and around 1 to 2.5 inches wide. With hollow body 36, lure 10 will preferably be around 2.75 to 7 inches long (in a retracted position) and around 1.25 to 4 inches wide. Other sizes may also be used depending on the size and type of fish desired. Lure 10 can be reused multiple times by simply pushing hook 18 inward toward housing 12 to compress spring 28 and re-engaging guard 20 with hook 18 (or barb 24 or other releasable connection used in weedless guard system 16) to hold spring 28 in the retracted position in preparation for the next fish strike.

Although primarily described with a two hook configuration as shown in the figures, embodiments of the invention may use a single hook or any multiple hook configuration as will be understood by those of ordinary skill in the art. Those of ordinary skill in the art will also appreciate upon reading this specification and the description of preferred embodiments herein that modifications and alterations to the system may be made within the scope of the invention and it is intended that the scope of the invention disclosed herein be limited only by the broadest interpretation of the appended claims to which the inventors are legally entitled.

I claim:

1. A fishing lure comprising:
   a decorative hollow body;
   a housing disposed inside the hollow body, the housing having a sealed first end, a second end, and a longitudinal axis;
   a hook extending outwardly of the second end of the housing, the hook comprising a longitudinal body aligned with the longitudinal axis, a curved portion connected to the longitudinal body, and a barb disposed at an end of the curved portion, wherein the entirety of the hook is disposed inside the decorative hollow body when in a retracted position;
   a guard having a first end and a second end, the first end of the guard directly connected to the first end of the housing and the second end of the guard configured to be releasably connectable to the hook to releasably hold the longitudinal body of the hook in the retracted position disposed a first distance from the first end of the housing;
   a plate disposed inside the housing and wherein the longitudinal body of the hook is substantially perpendicular to and connected to the plate; and
   a sealing ring disposed around the plate;
   a spring disposed between and in contact with the first end of the housing and the plate and configured to move the longitudinal body of the hook along the longitudinal axis to an extended position disposed a second distance from the first end of the housing when the guard is released from the hook;
   wherein the decorative hollow body comprises an aperture configured to allow the curved portion and the barb of the hook to pass through the aperture when the longitudinal body is being moved by the spring to the extended position;
   wherein the extended position is around 1-3 inches from an end of the decorative hollow body proximal to the hook;
   wherein the lure is configured to float at or near a surface of water;
   wherein (1) the guard is disposed entirely inside the hollow body, (2) no part of the guard is directly connected to the hollow body, and (3) the guard does not directly engage with the barb to hold the hook in the retracted position;
   wherein the guard is configured to release the longitudinal body of the hook from the retracted position upon application of pressure in a direction substantially perpendicular to the direction of movement of the longitudinal body of the hook; and
   wherein the first distance is shorter than the second distance.

2. The fishing lure of claim 1 wherein the decorative hollow body is shaped like a frog, fish, worm, or insect.

3. A fishing lure comprising:
   a hollow body;
   a housing disposed inside the hollow body, the housing having a first end, a second end, and a longitudinal axis;
   a hook extending outwardly of the second end of the housing, the hook comprising a single longitudinal body aligned with the longitudinal axis, a first curved portion connected to the single longitudinal body, a second curved portion connected to the single longitudinal body, and a first barb disposed at an end of the first curved portion distal from the single longitudinal body, a second barb disposed at an end of the first curved portion and the second curved portion, and an optional third barb connected to the brace;
   a guard having a first end and a second end, the first end of the guard directly connected to the first end of the housing and the second end of the guard configured to be releasably connectable to the hook to releasably hold the single longitudinal body of the hook in a retracted position disposed a first distance from the first end of the housing;
   a spring disposed inside the housing and configured to move the single longitudinal body of the hook along the longitudinal axis to an extended position disposed a second distance from the first end of the housing when the guard is released from the hook;
   a plate disposed inside the housing and a sealing ring disposed around the plate;
   wherein the guard releasably engages with the brace, the first barb, the second barb, or the optional third barb to hold the single longitudinal body of the hook in the retracted position,
   wherein the first end of the housing is sealed;
   wherein the spring is disposed between and in contact with the first end of the housing and the plate;
   wherein the single longitudinal body of the hook is substantially perpendicular to and connected to the plate;
   wherein the hollow body comprises an aperture configured to allow the the first curved portion, the second curved portion, the first barb, and the second barb of the hook to pass through the aperture when the single longitudinal body is being moved by the spring to the extended position;
   wherein the guard is configured to release the single longitudinal body of the hook from the retracted position upon application of pressure in a direction substantially perpendicular to the direction of movement of the single longitudinal body of the hook;

wherein the entirety of the hook is disposed inside the hollow body when the single longitudinal body is in the retracted position;

wherein the guard is disposed entirely inside the hollow body and no part of the guard is directly connected to the hollow body;

wherein the first distance is shorter than the second distance; and wherein the lure is configured to float at or near a surface of water.

4. A fishing lure comprising:

a decorative hollow body comprising at least one aperture;

a housing disposed inside the decorative hollow body, the housing having a sealed first end, a second end, a substantially cylindrical sidewall extending from the first end to the second end, an annular lip extending inwardly from the substantially cylindrical sidewall, and a longitudinal axis;

a single plate disposed inside the housing;

a sealing ring disposed around the plate and configured to seal against the cylindrical sidewall;

a hook extending outwardly of the second end of the housing, the hook comprising a single longitudinal body aligned with the longitudinal axis and connected at a first end substantially perpendicularly to the single plate, a first curved portion connected to the single longitudinal body, a first barb disposed at an end of the first curved portion, a second curved portion connected to the single longitudinal body, a second barb disposed at an end of the second curved portion, and a brace connected to the first and the second curved portions;

a guard disposed entirely inside the decorative hollow body, the guard comprising a first end and a second end, the first end of the guard directly connected to the first end of the housing and the second end of the guard configured to releasably engage with the brace to releasably hold the hook in a retracted position wherein the first end of the single longitudinal body is disposed a first distance from the first end of the housing;

a spring disposed inside the housing between and in contact with the first end of the housing and the single plate, wherein the spring is configured to move the single longitudinal body of the hook along the longitudinal axis to an extended position when the hook is released by the guard, wherein the first end of the single longitudinal body is disposed a second distance from the first end of the housing when in the extended position, and wherein the first distance is shorter than the second distance;

wherein no part of the guard is directly connected to the hollow body, the guard does not directly engage with the first barb or the second barb to hold the hook in the retracted position, the guard only directly contacts the housing at the first end of the guard and the first end of the housing, the first end of the guard does not move relative to the housing, and the guard is configured to release the hook from the retracted position upon application of pressure in a direction substantially perpendicular to the direction of movement of the single longitudinal body of the hook;

wherein the at least one aperture in the decorative hollow body is configured to allow the first and the second curved portions and the first and the second barbs of the hook to pass through the aperture when the longitudinal body is being moved by the spring to the extended position;

wherein the entirety of the hook is disposed inside the decorative hollow body when in the retracted position and the hook does not move in a substantially arcuate direction when released by the guard;

wherein the single longitudinal body and the first and the second curved portions have a first relative positioning with respect to each other when the hook is in the retracted position and have a second relative positioning with respect to each other when the single longitudinal body of the hook is in the extended position that is the same as the first relative positioning;

wherein the annular lip is configured to retain the single plate in the housing; and wherein the lure is configured to float at or near a surface of water.

\* \* \* \* \*